US00RE33824E

United States Patent [19]

Johnson

[11] E Patent Number: Re. 33,824

[45] Reissued Date of Patent: Feb. 18, 1992

[54] FAULT DETECTING INTRUSION DETECTION DEVICE

[76] Inventor: Richard A. Johnson, 3285 Curtis Cir., Pleasanton, Calif. 94566

[21] Appl. No.: 429,054

[22] Filed: Oct. 30, 1989

Related U.S. Patent Documents

Reissue of:

[64] Patent No.: 4,710,750
Issued: Dec. 1, 1987
Appl. No.: 893,399
Filed: Aug. 5, 1986

[51] Int. Cl.[5] ..... G08B 13/18

[52] U.S. Cl. ..... 340/522; 340/523; 340/506; 340/554; 340/567; 367/94

[58] Field of Search ..... 367/93, 94; 342/52, 342/53; 340/506-508, 511-514, 516-517, 522-523, 554-555, 567, 587

[56] References Cited

U.S. PATENT DOCUMENTS

| | | | |
|---|---|---|---|
| 3,074,053 | 1/1963 | McDonough et al. | 340/522 |
| 3,448,449 | 6/1969 | Schulz et al. | 340/514 X |
| 3,725,888 | 4/1973 | Solomon | 340/522 |
| 3,727,216 | 4/1973 | Antonio | 340/554 |
| 3,801,978 | 4/1974 | Gershberg et al. . | |
| 4,222,041 | 9/1980 | Von Tomkewitsch | 340/506 X |
| 4,243,979 | 1/1981 | Kleinschmidt | 340/554 |
| 4,275,390 | 6/1981 | Heywang et al. | 340/554 |
| 4,331,952 | 5/1982 | Galvin et al. | 340/522 |
| 4,401,976 | 8/1983 | Stadelmayr . | |
| 4,482,889 | 11/1984 | Tsuda et al. | 367/94 |
| 4,528,553 | 7/1985 | Hastings et al. . | |
| 4,611,197 | 9/1986 | Sansky | 340/522 |
| 4,625,199 | 11/1986 | Pantus | 340/565 X |
| 4,660,024 | 4/1987 | McMaster | 340/522 |
| 4,833,450 | 5/1989 | Buccola et al. | 340/522 X |
| 4,882,567 | 11/1989 | Johnson | 340/522 |

FOREIGN PATENT DOCUMENTS 0107042 5/1984 European Pat. Off. .

*Primary Examiner*—Thomas H. Tarcza
*Assistant Examiner*—Tod R. Swann

[57] ABSTRACT

In an improved intrusion detection device system of the dual-sensor type, wherein one sensor is a PIR sensor and the other is a microwave sensor, the improvement comprises counting the detection of intrusion separately by the microwave sensor and by the passive infrared sensor. Thereafter, the counts by the two separate detectors are compared and an indication is given if the number exceeds a certain user selectable threshold, to indicate fault in one of the two sensor subsystems.

11 Claims, 3 Drawing Sheets

FAULT DETECTING INTRUSION DETECTION DEVICE

Matter enclosed in heavy brackets [ ] appears in the original patent but forms no part of this reissue specification; matter printed in italics indicates the additions made by reissue.

*This is a reissue of application Ser. No. 893,399 filed 8-5-86, now U.S. Pat. No. 4,710,750.*

TECHNICAL DESCRIPTION

The present invention relates to an improved intrusion detection device and, more particularly, to an improved intrusion detection device of the type having two sensors and the ability to detect fault within one of the two sensors.

BACKGROUND OF THE INVENTION

Combination intrusion detection devices are well-known in the art. A typical combination is the use of a passive infrared intrusion detection device along with a microwave intrusion detection device. The output of the two sensors are supplied to an AND gate. If both of the sensors detect the presence of an intruder, then an alarm is triggered.

The combination of the electrical outputs of two independent sensing subsystems with each subsystem responding to different stimuli in a complementary manner significantly reduces the possibility of false alarms. This reduction of false alarms more than offsets the higher costs in the manufacturing of these combination intrusion detection devices.

One drawback of a combination dual sensing device is that if one of the sensors or subsystems fails to operate properly, the integrity of the entire system is lost. This is because once a subsystem or the sensor thereof has failed (assuming that it fails in the open mode; i.e., the failed sensor/subsystem never detects the presence of an intruder), and since the entire system is dependent upon the presence of a signal on both of the sensor subsystems, the failure of one sensor subsystem fails the entire system.

There are many possible causes of failure of a sensor or its subsystem. One possible failure of a sensor or its subsystem is the failure in the electrical circuitry. A second possible source of sensor failure is if the sensor is not installed properly. In order for the entire intrusion detection system to function properly, both sensor subsystems must be directed at the same volume or space location. Both sensors must detect the presence of an intruder in the same or proximate location. Thus, there must be overlapping of the area or space of detection of the two sensors. If the two sensor subsystems are not aligned properly and are not directed towards the same space or volume location, the non-overlapping field will result in the entire system never producing alarm. This is because an intruder will always be detected by only a single sensor subsystem. Another source of failure is due to tampering. If a would-be intruder has masked or disabled one sensor subsystem, there again the disablement of that sensor subsystem would have disabled the entire system.

Thus, it is highly desirable in an intrusion detection system of the dual sensor subsystem type to be able to detect any internal electrical malfunction of any one of the sensor subsystems, or to detect any physical tampering of any one of the sensor subsystems, or to detect any masking of the normal fields of use of any of the sensor subsystems or to detect the improper installation which results in substantially different fields of view of each sensor subsystem. Any of these conditions may be termed collectively as a "fault condition".

SUMMARY OF THE INVENTION

In the present invention, an improvement to an intrusion detection apparatus is disclosed. The intrusion detection apparatus is of the type having dual sensors with each of the two sensors providing a signal upon the detection of an intruder. Logic means is further provided to process the two signals from the dual sensors to trigger an alarm in the event the intruder is detected by both of the sensors. The improvement comprises a first storage means for storing the number of signals recorded by one of the dual sensors. A second storage means stores the number of signals detected by the second sensor. A logic control means receives the output of the first and second storage means and compares the numbers stored therein and outputs a fault signal in response to this comparison.

DETAILED DESCRIPTION OF THE DRAWINGS

Figure 1:
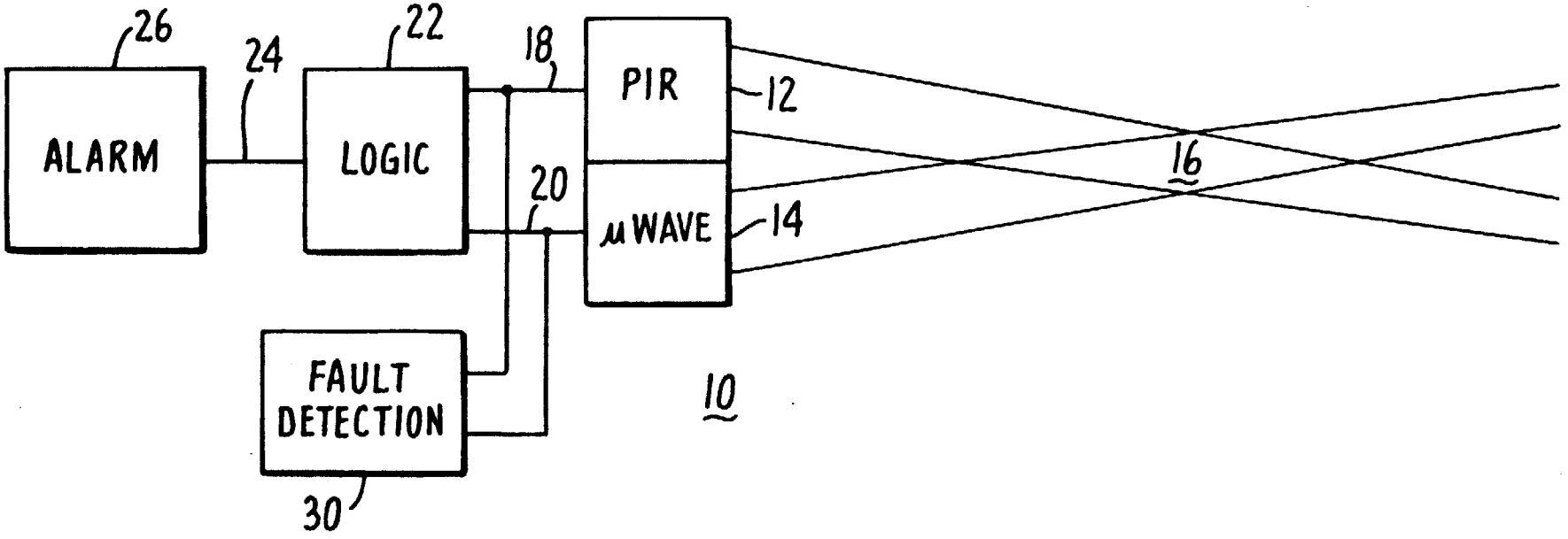
FIG. 1 is a schematic block diagram of an improved intrusion detection system of the present invention.

Referring to FIG. 1, there is shown a block diagram of an improved intrusion detection system 10 of the present invention. The intrusion detection system 10 of the present invention comprises a first sensor 12 subassembly and a second sensor 14 subassembly. The first sensor 12 subassembly is typically a passive infrared radiation detection subsystem. The second sensor 14 subassembly is typically a microwave energy detection subsystem. Each of the first sensor 12 subsystem and second sensor 14 subsystem is directed to detect intruders within the same space or volume of space 16. Each of the first sensor 12 subsystem and second sensor 14 subsystem produces a first output signal 18 and a second output signal 20, respectively, upon the detection of an intruder within the space or volume 16 to which the subsystem is directed. Such a system 10, using the combination of a photoelectric sensor and microwave detector is fully described in U.S. Pat. No. 3,725,888.

The first and second output signals 18 and 20, respectively, are supplied to a logic controller 22. The logic controller 22 produces an output signal 24 which triggers an alarm 26 in the event an intruder is detected by both the first sensor 12 subsystem and the second sensor 14 subsystem, within a specified period of time.

In the improved intrusion detection device 10 of the present invention, the device 10 also comprises a fault detection subsystem 30. The fault detection subsystem 30 also receives the first and second output signals 18 and 20, respectively.

Figure 2:
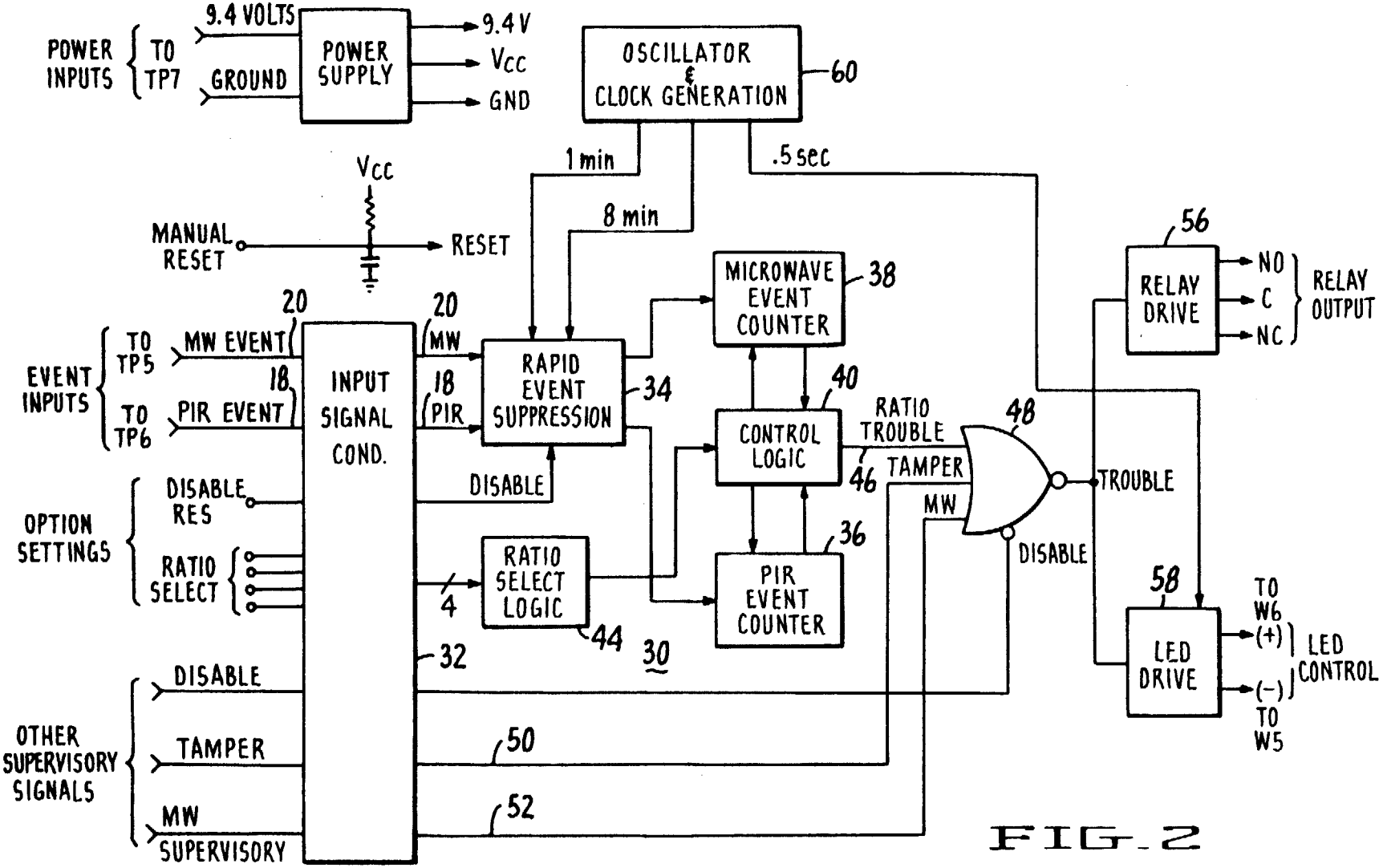
FIG. 2 is a schematic block diagram of the fault detection subsystem of the intrusion detection device of the present invention.

Referring to FIG. 2, there is shown in block diagram the fault detection subsystem 30. The fault detection subsystem 30 comprises an input signal conditioner 32 to which the first and second output signals 18 and 20, respectively, are supplied. The input signal conditioner 32 processes the input signals, by for example, holding them for a predetermined period of time.

From the input signal conditioner 32, the first and second output signals 18 and 20 are supplied to a rapid event suppressor 34. The rapid event suppressor 34 detects the presence of a rapid series of pulses. If this occurs, the fault detection subsystem 30 will stop counting the output signal 18 or 20 for a preset period of time. From the rapid event suppressor 34, the first and second output signals 18 and 20, respectively, are supplied to a first and a second counters 36 and 38, respectively. The output of the first and the second event counter 36 and 38 are supplied to a control logic 40. The control logic 40 also receives a user selectable ratio number along input lines 42 which pass through a ratio select logic 44. The output of the control logic 40 is a signal which can indicate fault in one of the two sensor subsystems. That fault signal 46 is supplied to a NOR gate 48. Other inputs to the NOR Gate 48 are a tamper signal 50 and a microwave supervisory signal 52. Further, the NOR gate 48 may be disabled by a signal sent along the disabled line 54.

The output of the NOR gate 48 is a signal which is supplied to a relay drive 56 and to an LED drive 58 which informs the user of the fault that is detected. An oscillator and clock generator 60 supplies the necessary clocking signals to the rapid events suppressor 34 and to the LED drive 58.

Figure 3:
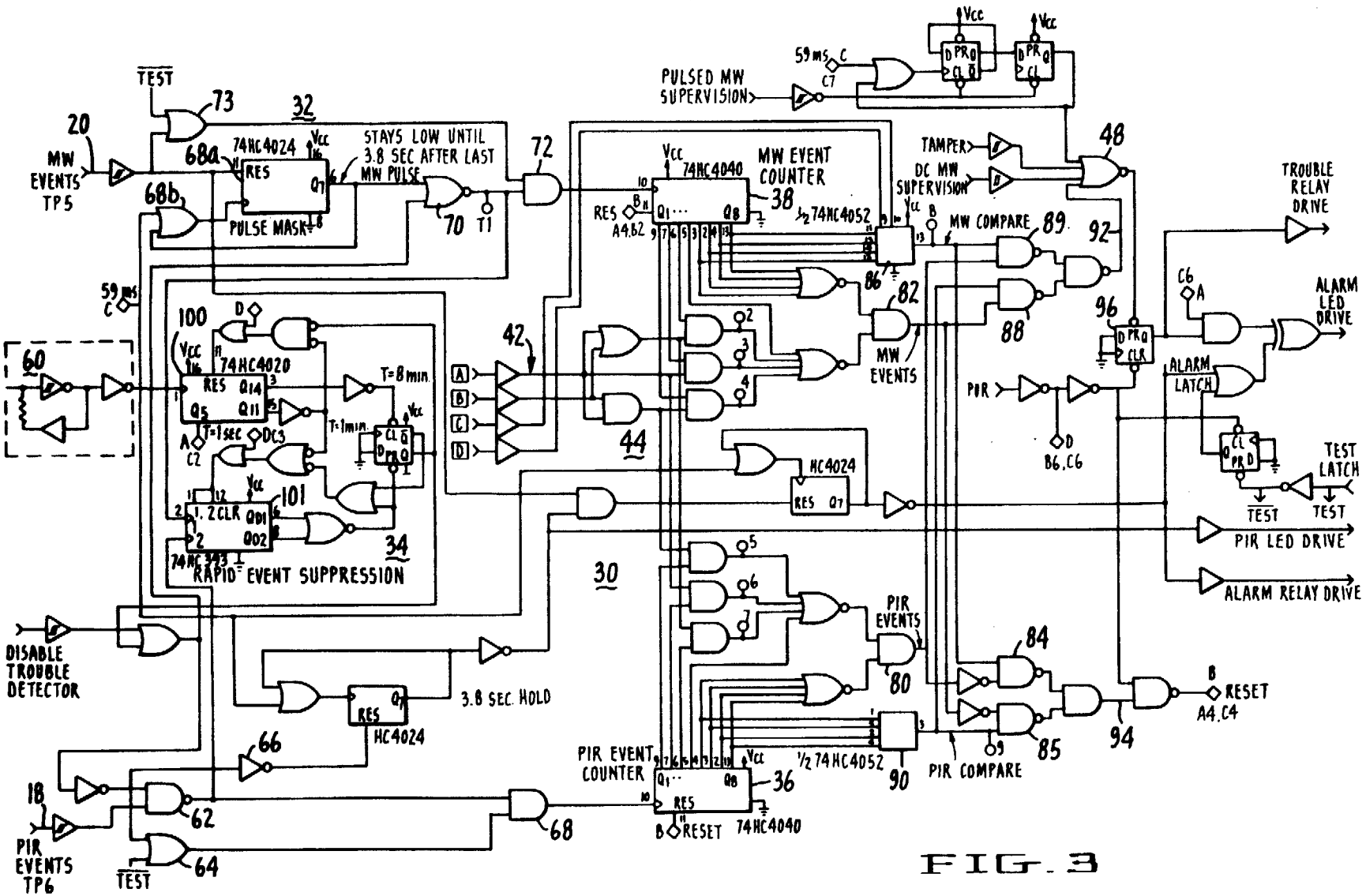
FIG. 3 is a detail circuit diagram of the fault detection subsystem of the present invention.

Referring to FIG. 3, there is shown in greater detail the various block components of the fault detection subsystem 30 described in FIG. 2. The first sensor output signal 18 is supplied to a NAND gate 62, and to an OR gate 64 and an invertor 66. The output of the NAND gate 62 is supplied to a second AND gate 68, which is then supplied to the first counter 36, which is an eight (8) bit counter. NAND gate 62 is also controlled by the rapid event suppressor 34. In the event a rapid series of pulses is detected by the suppressor 34, NAND gate 62 is turned off thereby preventing first sensor output signal 18 from reaching the first counter 36. Gates 64 and 68 are used for testing purposes.

The second output signal 20 from the microwave detection subsystem 14 is supplied to a one-shot 68 (which comprises a counter 68a and an OR gate 68b), which keeps the signal low for approximately 3.8 seconds after the last microwave pulse. The output of the one-shot 68 is then passed to a NOR gate 70, to an AND gate 72 and to the second counter 38, which is also an eight bit counter. The function of the NOR gate 70 is similar to the NAND gate 62. AND gates 72 and 73 are also used for testing purposes.

The rapid event suppressor 34 comprises, in part, a long counter 100 and a dual counter 101. The long counter 100 receives timing pulses from the oscillator and clock generator 60. The dual counter 101 receives the first and second output signals 18 and 20 (after passing through gates 62 and 70, respectively).

The long counter 100 resets the dual counter 101 every one (1) minute. In the event the dual counter 101 receives greater than or equal to eight (8) signals (first or second output signals 18 or 20) within a one minute interval, the dual counter 101 (1) causes the dual counter 101 to be reset; (2) turns off gates 62 and 70 for eight (8) minutes; and (3) after eight (8) minutes, turns on gates 62 and 70 and resumes normal operation.

The four user selectable ratio signals 42 are supplied to the ratio select logic 44 which comprises a plurality of AND gates, an OR gate and multiplexers 86 and 90, all as shown and connected in FIG. 3. Two of the four user selectable ratio signals 42 are used to disable the appropriate least significant bits (LSB) from the first and second counters 36 and 38 to obtain the conditions of (1) greater than 0; (2) greater than 1; (3) greater than 3; or (4) greater than 7 as inputs to PIR AND gate 80 and MW AND gate 82. The output of the PIR AND gate 80 and MW AND gate 82 is a determination of the number of signals (18 or 20, respectively) counted by counters 36 and 38 which meets or exceeds the number set by two of the four user selectable input lines 42.

The other two user selectable lines 42 are supplied to multiplexers 86 and 90. The multiplexers 86 and 90 select one of the four MSB from counters 36 and 38 and supplies that as input to PIR AND gate 85 and MW AND gate 89, and also to gates 88 and 84, respectively. When either the counter 36 or 38 reaches a number of the MSB that is selected by the two user selectable lines 42, that causes a compare event at 92 and 94. In that event, the least significant bits of the counter 36 or 38 that did not cause the compare event is analyzed to determine if that number meets or exceeds the number set by the other two user selectable lines.

In the event the number of the counts of the least significant bits of the counter that did not cause the compare event, meets or exceeds the user selected threshold, then a pulse appears at 94. This indicates "no fault". The no fault pulse 94 resets the first and second counters 36 and 38. However, if the converse occurred, a pulse would appear at 92. This indicates a "fault", i.e., too many signals of the sensor of one type are counted as compared to the signals of the sensor of the other type. The fault pulse 92 is supplied to the NOR gate 48, which then triggers a flip flop 46. The Q output of the flip flop 96 triggers the relay drive 56 and the LED drive 58.

In the operation of the fault detection subsystem 30, the user first selects the number of events to cause the compare and the minimum for the compare. During the unarmed stage, the first and second sensors 12 and 14 would be counting the intruders in the space 16. These counts would be collected by the fault detection subsystem 30 and stored in the first and second counters 36 and 38, respectively. When the first or second counter 36 or 38 reaches the number set by the user for a compare event, the number of counts stored in the counter that did not cause the compare event is compared to the minimum set by the user. If that number is greater than the minimum, then "no fault". Otherwise there is a fault in one of the sensor subsystems.

It should be emphasized that the operation of the fault detection subsystem 30 in no way impedes the arming or disarming of the intrusion detection device 10. During the time that the fault detection subsystem 30 is in operation, the intrusion detection device 10 can still be armed.

There are many advantages to the improved intrusion detection system 10 of the present invention. First and foremost, with the use of a dual sensor intrusion detection system, false alarm is minimized. Furthermore, with the fault detection 30, it is seen that the failure of one of the sensor subsystems can be easily detected, and an indication be sent to the user of the failure of the intrusion detection device 1. Thus, the intrusion detection device 10 has all of the advantages of both fail-safe, as well as reliability.

I claim:

1. In an intrusion detection apparatus of the type having dual sensing means, a first sensing means for generating a first output signal in response to the detection of an intruder, a second sensing means for generating a second output signal in response to the detection of an intruder, and logic means for receiving said first and said second output signals and for generating an alarm in response thereto, wherein the improvement comprising:

first means for storing the number of first output signals received from said first sensing means;

second means for storing the number of second output signals received from said second sensing means; and logic means for comparing the number of first output signals from said first storing means and the number of second output signals from said second storing means and for generating an output signal indicative of fault in said apparatus, in response to said comparison.

2. The apparatus of claim 1 wherein said logic means further comprises:

user selectable means for selecting a threshold number and means for comparing the number of second output signals from said second storing means to the number of first output signals from said first storing means, in the event said number from said second storing means exceeds said threshold number.

3. The apparatus of claim 1 wherein said first sensing means is a passive infrared detecting sensing means and said second sensing means is a microwave detecting sensing means.

4. The apparatus of claim 1 wherein said first storing means is a counter.

5. The apparatus of claim 1 wherein said second storing means is a counter.

6. The apparatus of claim 2 wherein said logic means further comprises:

user selectable means for selecting a minimum number and a second means for comparing the number of first output signals from said first storing means to said minimum number, in the event said number from said second storing means exceeds said threshold number; and said second comparing means for generating said output signal in response to said comparison.

*7. In an intrusion detection system of the class employing dual technology subsystems, wherein a first subsystem provides a first output signal responsive to the detection of an intruder and wherein a second subsystem provides a second output responsive to the detection of an intruder and including means responsive to said first and second output signals for generating an alarm, the improvements therein comprising:*

*first counting means for counting the number of said first output signals provided by said first subsystem and for providing an output signal when said count equals a selected count,*

*second counting means for counting the number of said second output signals provided by said second subsystem and for providing an output signal when said count equals a predetermined count,*

*logic means coupled to said first and second counting means for generating a fault signal indicating a system malfunction for said output signal from said first or second counting means.*

*8. The system according to claim 7 wherein said first subsystem is a microwave intrusion detection system with said second subsystem being a passive infra-red intrusion detection system.*

*9. The system according to claim 7 wherein said first counting means is a binary counter having a plurality of outputs and including switching means for selecting any one output as said selected count.*

*10. The system according to claim 7 wherein said second counting means is a decade counter.*

*11. The system according to claim 7 including means coupled to said first and second counting means for resetting said counting means when said first and second output signals are simultaneously provided.*

* * * * *